United States Patent
Mang et al.

(10) Patent No.: US 6,358,580 B1
(45) Date of Patent: Mar. 19, 2002

(54) SEALING MATERIAL WHICH SWELLS WHEN TREATED WITH WATER

(75) Inventors: Thomas Mang, Saalangerstrasse 40, D-82377 Penzberg (DE); Günter Preiser; Jürgen Dahm, both of Schattdorf (CH)

(73) Assignees: Thomas Mang, Penzberg (DE); Datwyker A.G. Gummi & Kunststoffe, Schattdorf (CH)

( * ) Notice: Subject to any disclaimer, the term of this patent is extended or adjusted under 35 U.S.C. 154(b) by 0 days.

(21) Appl. No.: 09/582,958

(22) PCT Filed: Jan. 8, 1999

(86) PCT No.: PCT/EP99/00075

§ 371 Date: Jul. 7, 2000

§ 102(e) Date: Jul. 7, 2000

(87) PCT Pub. No.: WO99/35208

PCT Pub. Date: Jul. 15, 1999

(30) Foreign Application Priority Data

Jan. 9, 1998 (DE) ......................... 198 00 489

(51) Int. Cl.$^7$ ............................ B29D 22/00; C08L 5/00
(52) U.S. Cl. .................. 428/35.7; 524/27; 524/28; 524/35; 524/47; 524/56; 524/57; 524/58; 524/81; 524/82; 524/186; 524/457; 524/543; 525/54.24; 525/54.26; 525/54.31; 525/55; 525/88; 525/185; 525/191; 521/56; 521/59; 428/34.3; 428/35.2; 428/35.8; 428/36.1; 428/304.4; 428/423.9; 428/424.2
(58) Field of Search .................... 524/27, 28, 35, 524/47, 56, 57, 58, 81, 82, 186, 457, 543; 525/54.24, 54.26, 54.31, 55, 88, 185, 191; 521/56, 59; 428/34.3, 35.2, 35.7, 35.8, 36.1, 304.4, 423.9, 424.2

(56) References Cited

U.S. PATENT DOCUMENTS

| 4,708,351 A | * | 11/1987 | Midooka et al. ............. 277/184 |
| 4,756,952 A | * | 7/1988 | Sasayama et al. ........... 428/212 |
| 4,774,284 A | * | 9/1988 | Iwasa ........................... 525/57 |
| 5,011,875 A | * | 4/1991 | Yamamoto et al. ............ 524/45 |
| 5,075,373 A | * | 12/1991 | Takemori et al. .............. 525/57 |

FOREIGN PATENT DOCUMENTS

| CH | 115 941 | | 7/1926 |
| DE | 33 32 15 | | 3/1920 |
| DE | 3532961 | * | 3/1986 |
| DE | 3610645 | * | 10/1986 |
| DE | 4224044 | * | 1/1994 |
| DE | 42 21381 C1 | | 2/1994 |
| DE | 43 00 772 A1 | | 7/1994 |
| DE | 195 16 957 A1 | | 11/1996 |
| EP | 0160438 | * | 11/1985 |
| EP | 0179937 | * | 5/1986 |
| JP | 6 -157839 | | 6/1994 |
| WO | WO 94/02556 | * | 2/1994 |

OTHER PUBLICATIONS

PCT/EP99/00075 International Search Report in German Language (Form PCT/ISA/220 (1 page) and PCT/ISA/210 (4 pages) dated May 10, 1999.
PCT/EP99/00075 Partial Translation of International Search Report in to English English Language (Form PCT/ISA/210) (3 pages) dated May 10, 1999.
PCT/EP99/00075 First Examination Report in German Language (Form PCT/IPEA/409) (4 pages) dated Aug. 23, 1999.
PCT/EP99/00075 International Preliminary Examination Report in German Langauge (Form PCT/IPEA/409) (5 pages) dated Mar. 3, 2000.
PCT/EP99/00075 Translation of International Preliminary Examination Report into English Language (Form PTO/IPEA/409) (5 pages) date Mar. 3, 2000.
English Language Translation of Japanese Kokai Patent Hei 6–157839 (13 page).
Abst. of Jap. Pat. JP 6–157839 from Database WPI, Derwent Publications Ltd., London, G. B.; AN 94–222123; XP–002101419 (1 page) entitled "Water Absorbtive Resin Composition. . .".
Abst. of Jap. Pat. JP 05295335/JP2688689 from Database WPAT, AN 93–392936/49 entitled "Cold Seal Adhesive Composition . . . ".

* cited by examiner

Primary Examiner—Samuel A. Acquah
(74) Attorney, Agent, or Firm—Paul A. Beck & Associates

(57) ABSTRACT

The invention relates to an optionally foamed sealing composition for preformed seals which can swell when treated with water. The invention also relates to a method for the production thereof out of natural rubber and/or elastomers with a matrix comprised of natural rubber/elastomer components and particle-shaped water absorbing material stored therein. The water absorbing material is a combination of (A) polysaccharide(s) selected from cellulose, starch, starch derivatives removed from grafted starch, amylose, amylopectin, dextran, pectin, inulin, chitin, xanthan, alginic acid, alginates, carrageenan, pustulan, callose, laminarin, guluronic acid, pullulan, lichenin or mixtures of the same with (B) a highly water absorbent synthetic polymer selected from polymers based on (meth)acrylate, poly(meth)acrylic acid and the salts thereof, polyacrylamide, polyalcohols or copolymers of said synthetic polymers. The invention also relates to additional cross-linking and processing auxiliary agents and to property improving agents. It is possible to securely seal superstructures, substructures, tunnels and canals with the assistance of the inventive sealing compositions.

28 Claims, No Drawings

SEALING MATERIAL WHICH SWELLS WHEN TREATED WITH WATER

TECHNICAL FIELD OF THE INVENTION

The present invention is directed to water-swellable seal compositions for producing preformed seals for structural, civil and technical engineering, especially for joint sealing and for compensating dimensional changes in structural components. The seal compositions include elastomers and, embedded in their matrix, a combination of strongly water-absorbing materials such as polysaccharides and hydrophilic polymers which are known as superabsorbents.

BACKGROUND OF THE INVENTION

Water-swellable seal compositions are well known.

DE-A-42 26 198 describes a water-swellable seal material, particularly for joint sealing and for compensating dimensional changes in structural, civil and technical engineering or in other technical areas. The seal material is producible by polymerization of a reaction mixture of monomeric water-soluble or water-miscible acrylic and/or methacrylic acids and/or derivatives thereof. The sealing materials described have the disadvantage of using toxic raw materials which will partly remain in the sealing material even after the tape has cured and pollute the environment.

DE-A-36 10 645 discloses a water-swellable seal material which includes as the polymeric base material not a hydrophobic polymer such as rubber but a hydrophilic addition product of a low molecular weight polyolefinpolyol and ethylene oxide that contains reactive hydroxyl groups. The composition includes as water-absorbing polymers hydrolyzed PVA-sodium acrylate copolymers, CMC, hydrolyzed polyacrylic acids, mixtures of starch and hydrolyzed polyacrylonitriles or mixtures of starch and sodium polyacrylates. Crosslinking is effected using isocyanate.

DE-A-35 32 961 describes a seal material which includes a water-swellable material comprising a mixture of water-absorbing polymer and rubber or synthetic resin. Water-absorbing polymers mentioned are CMC, starch-polyacrylonitrile hydrolyzate, starch-polyacrylate, sodium polyacrylate hydrolyzate. The water-swellable material may be foamed so that its specific density is 0.1 to 0.9 g/cm$^3$.

EP-A-160 438 describes a water-swellable caulking material which comprises a body of water-swellable polymer material and non-water-swellable material that is surrounded by a layer which is impervious to neutral water, but previous to alkaline water. The body includes a water-insoluble rubbery polymer and a strongly water-absorbent resin, e.g. crosslinked polyacrylic acid salts, reaction products of starch and polyacrylic acid.

U.S. Pat. No. 5,011,875 is directed to water-swellable caulking compositions of rubber, thermoplastic polymers and water-absorbent material, such as polymers based on acrylic acid, starch-polyacrylic acid graft copolymers, starch-polyacrylonitrile graft copolymers, CMC.

U.S. Pat. No. 5,075,373 discloses a water-swellable seal material which comprises, embedded in a matrix of rubber or synthetic polymers, particles of a water-absorbent resin, for example crosslinked polyacrylic acid salts, starch-acrylic acid graft copolymers, starch-ethyl acrylate graft copolymers, CMC.

EP-A-118 998 is directed to a water-swellable seal comprising chloroprene rubber blended with hydrophilic water-absorbing polymers such as starch-polyacrylate graft copolymers, polyacrylates, poly(meth)acrylic acid salts, maleic anhydride copolymers.

EP-A-055 848 discloses a water-absorbing rubber mixture composed of a 1,3-diene rubber and, dispersed therein, a resin of high water absorbency, for example maleic anhydride copolymers, crosslinked alkali metal salts of polyacrylic acid.

EP-A-410 669 describes a water-swellable seal composition comprising a vulcanized rubber material, a strongly water-absorbent resin, such as poly(acrylic acid)-based resins, maleic anhydride copolymers, basic water-absorbing inorganic material, plasticizers, vulcanizing agents and customary auxiliaries.

DE-A-196 19 709 discloses a seal material comprising a metal sheet with an overcoat of a superabsorbent polymer, fibers and rubber.

JP-A-6-157839 discloses a water-swellable seal composition which comprises an unvulcanized resin component comprising a specific noncrosslinked thermoplastic olefinic elastomer and a hydrogenated diene copolymer, the composition also including a water-absorbing resin and, if desired, cellulose fibers.

However, the known seal materials have disadvantages, especially when used in composite seals. Inorganic aggregates lead to severe equipment wear when producing and processing the seals. Frequently, the requisite extensibility and elasticity is lost on drying. Most seal materials have a relatively high specific density (>1 g/cm$^3$) and the elasticity is limited. They further frequently include toxic constituents.

OBJECT OF THE INVENTION

It is an object of the present invention to provide a water-swellable seal material for preformed seals that is primarily produced from nontoxic raw materials and is readily processible into preformed seals, including composite seals. Furthermore, machine problems, such as abrasion, shall be avoided in the production of the seals. The swellability shall be conformable to specific requirements in structural, civil and technical engineering.

SUMMARY OF THE INVENTION

This object is achieved by water-swellable seal compositions for preformed seals comprising a matrix of elastomer component(s) and embedded particulate water-absorbent material, characterized in that the water-absorbent material is a combination of (A) polysaccharide(s) selected from microcrystalline or amorphous cellulose, starch, starch derivatives except grafted starch, amylose, amylopectin, dextrans, pectins, insulin, chitin, xanthan, alginic acid, aglinates, carragheenan, pustulan, callose, laminarin, guluronic acid, pullulan, lichenin or mixtures thereof with (B) water-superabsorbent synthetic polymer selected from polymers based on (meth)acrylate, poly(meth)acrylic acid and salts thereof, polyacrylamide, polyalcohols or copolymers thereof, and the seal composition is foamed by means of a blowing agent and heating to 100° C. or higher and the elastomer components is (are) crosslinked.

It is also possible to use mixtures of water-superabsorbent synthetic polymers.

The water-swellable seal compositions include 6.67 parts by weight to 600 parts by weight of polysaccharide(s) and 2.67 parts by weight to 100 parts by weight of water-superabsorbent synthetic polymer(s) per 100 parts by weight of elastomer component(s).

The seal compositions of the invention include a blowing agent and are expanded by heating to 100° C. or higher.

After the vulcanizing or crosslinking of rubber(s) to elastomer(s) as elastomer component(s), the seal compositions of the invention will increase in volume by 5–600% by volume on exposure to water for 3 to 7 days.

It is particularly preferable, through appropriate choice of type and fraction of polysaccharide and superabsorbent synthetic polymer, of the porosity, of the crosslinking, of the hardness of rubber and elastomer, to set the swellability, more particularly to construct relatively low-swelling preformed seals having a volume increase of 5–30% by volume, particularly preferably having a volume increase of 10–20% by volume, and/or strongly swelling preformed seals having a volume increase of above 50% by volume to 500% by volume.

The preformed composite or noncomposite seals can be constructed as tapes, round cords, endless profiles with a variety of cross sections.

The composite or noncomposite seals of the invention can be used for sealing constructions in structural, civil or tunnel engineering, industrial engineering, but also in other applications requiring water-swellable seals.

The invention also provides a process for producing preformed seals which swell under the action of water, from seal compositions comprising a matrix of elastomer component(s) and an embedded particulate water-absorbent material which comprises mixing the constituents on mixing rolls, in an internal mixer or extruder and then forming and foaming and crosslinking the elastomer component(s) so that the volume increase on exposure to water for 3–7 days is 5–600% by volume.

DETAILED DESCRIPTION OF THE INVENTION

The seal composition of the invention generally additionally includes one or more customary additives, for example lubricants, aging inhibitors, dyes, fillers, blowing agents, plasticizers, crosslinking agents for rubber, crosslinking accelerants, activators, retarders, crosslinking agents for elastomers.

Useful fillers include in particular precipitated and/or pyrogenic silica, silicates, sand, mineral flour such as quartz, talcum, mica, chalk, kaolin, gypsum, lime, dolomite, basalt, kieselghur, baryte, feldspar, carbon blacks, polymeric hollow bore pigments, wood flour, rubber flour dust.

Useful placticizers include mineral oil of paraffinic, naphthenic or aromatic type, ester plasticizers such as dioctyl phthalate, ester plasticizers based on adipates or sebacates, phosphoric esters, stearic acid, palmitic acid, castor oil, cottonseed oil, rapeseed oil, but also polymeric plasticizers such as low molecular weight rubbers for example.

Useful crosslinking agents or vulcanizing agents for rubber and crosslinking agents for elastomers are the customary ones for this purpose, for example sulfur, sulfur compounds, peroxides and the like.

In principle it is also possible to effect the crosslinking using electron beam radiation. The crosslinking or vulcanization are carried out using the procedures customary in industrial practice.

The elastomer component (s), which is (are) present in vulcanized or crosslinked form in the finished seal composition, is selected from natural rubber (NR), cis-1,4-polyisoprene rubber (IR), polybutadiene (BR), randomly copolymerized styrene-butadiene rubbers (SBR or SIR), acrylate rubber, acrylonitrile-diene rubbers (NBR or NIR), polychloroprene (CR), ethylene-propylene rubber (EPR), isobutylene-isoprene rubbers (IIR), ethylene-propylene-diene rubber (EPDM), epichlorohydrin rubber, silicone rubber, polysulfide rubber, polyurethanes, thermoplastic elastomers. It is also possible to use mixtures of elastomers. The elastomer component(s) gives (give) the seal material in particular good mechanical properties, such as high elasticity and extensibility.

The above-selected very hydrophilic polysaccharides absorb water on contact and provide for water transportation into the seal composition and also have a swelling effect.

Water-insoluble, but water-swellable microcrystalline or amorphous cellulose for use in the seal compositions of the invention customarily have average particle sizes between 30 $\mu$m and 200 $\mu$m; the average particle size is between 350 $\mu$m and 800 $\mu$m in the case of granulated types.

The finely particulate cellulose preferably has bulk densities of 40 g/l to 300 g/l, very particularly preferably of 65 g/l to 170 g/l. If already granulated types are used, their bulk density is higher and can be from 350 g/l to 550 g/l.

Starch/starch derivatives can be of various origin, for example starch from rice, corn, wheat, potatoes and Leguminosae. It is also possible to use the corresponding meals with cellulosic plant constituents. Cold-swelling starches are preferred.

Polygalactomanans, for example guar or carob bean flour, already have this property in the native state and can be used directly or after a minimal modification.

Inherently non-cold-water-swelling starches are preferably used in the form of their derivatives. Chemically derivatized starches preferably contain substituents which are linked by ester or ether groups in sufficient number to the polysaccharide chains to confer cold water swellability.

Starches modified by ionic substituents, such as phosphate groups, are particularly advantageous and therefore preferred. It is further possible to use cold-water-swelling starches of the degraded starch type, for example acid-, enzyme- or oxidatively degraded starches or dextrinated starches. It is frequently of advantage for the swellability for the starch derivatives to be modified by a combination of degradation and chemical substitution.

To improve the swelling characteristics, it is also possible to use lightly crosslinked starches. Even alkali-treated starches can be used on account of their cold water solubility.

A further group of cold-water-swellable starches useful for the purposes of the invention is that of the native starches which have acquired cold swellability through a physical treatment. These include for example extruder starches and drum dryer starches.

To enhance the water absorption and particularly the associated volume increase, the seal compositions include a synthetic polymer in the form of strongly swelling granulate or powder. Particularly useful are linear polymers of (meth) acrylic acid, copolymers of (meth)acrylic acid or salts thereof having weight average molecular weights of 5000 to 70,000 and crosslinked polymers of (meth)acrylic acid, copolymers of (meth)acrylic acid or salts thereof with weight average molecular weights of 1,000,000 to 5,000,000. The copolymers are preferably copolymers of (meth) acrylic acid and maleic acid or maleic anhydride which for example 40 to 90% by weight of (meth)acrylic acid and 60 to 10% by weight of maleic acid or maleic anhydride whose relative molar mass, based on free acids, is between 3000 and 100,000, preferably 3000 to 70,000, and particularly preferably 5000 to 50,000.

Also useful are ter- and quatropolymeric polycarboxylates prepared from (meth)acrylic acid, maleic acid and vinyl alcohol or vinyl alcohol derivatives or those from (meth) acrylic acid, ethylenically unsaturated sulfonic acids and sugar derivatives, or those from (meth)acrylic acid, maleic acid, vinyl alcohol derivatives and sulfo-containing monomers.

Particular preference is also given to ter- and quatropolymeric polycarboyxlates prepared from (meth)acrylic acid, maleic acid and vinyl alcohol or vinyl alcohol derivatives (as described in DE-A-43 00 772) or those from (meth)acrylic acid, 2-alkylallylsulfonic acid and sugar derivatives (as described in DE-A-42 21 381) or those from (meth)acrylic acid, maleic acid, vinyl alcohol derivatives and monomers having sulfonic acid groups (described in DE-A-19 516 957).

These synthetic polymers or superabsorbents are crosslinked polymers which are capable of absorbing and binding a multiple of their weight of water to form hydrogels and thus lead, even if included in minor amounts, to a substantial volume increase of the sealing materials as a result of water swelling.

The superabsorbents to be used according to the invention are capable for example of binding up to 600 g of water per gram of superabsorbent, in some cases even up to 900 g of water/g of superabsorbent.

Particular preference is given to superabsorbents capable of absorbing 75 g to 200 9 of water per gram of superabsorbent within 50 seconds.

Preferably the water-superabsorbent polymers have an average particle size in the range from 5 $\mu$m to 800 $\mu$m.

Preference, however, is given to products having an average particle size below 400 $\mu$m. But, depending on requirements, it is also possible to use products having an average particle size of 400–800 $\mu$m.

It is preferred to use very fine superabsorbent particles. Superabsorbent particles having an average particle size of 70 to 150 $\mu$m do not burst or swell out of the elastomer matrix, whereas larger particles of 100 to 800 $\mu$m may partly burst out on first swelling and reduce the absorbency on renewed swelling. In the case of coarsely particulate superabsorbents (100–800 $\mu$m), the water-elutable constituents amount to about 3.5% by weight, whereas the elutable fraction is only 2–3% by weight in the case of more finely particulate superabsorbents.

Particularly useful superabsorbents have the following average particle size distribution:

| Particle size $\mu$m | Average in % Particle size Distribution in % Sample 1 | Average in % Particle size distribution in % Sample 2 | Average in % Particle size distribution in % Sample 3 |
|---|---|---|---|
| >800 | 1.3 | 0 | 0 |
| 800–560 | 30.9 | 0 | 0 |
| 560–400 | 30.8 | 0 | 0 |
| 400–250 | 19.7 | 0 | 0 |
| 250–200 | 8.0 | 2.2 | 0 |
| 200–160 | 3.1 | 9.6 | 0 |
| 160–100 | 4.0 | 44.6 | 59.1 |
| 100–50 | 0.2 | 29.3 | 37.7 |
| <50 | 0 | 10.5 | 2.3 |

Sample 1: Favor SAB 954, Sample 2: Favor CA 100 Feinstkorn, Sample 3: Cabloc C96.

The particle size distribution was determined as follows:

Of every swellable medium, 10.00 g were weighed out on an analytical balance and on the top sieve in a stack of sieves having sizes of 800; 560; 400; 250; 200; 160; 100 and 50 $\mu$m. The stack was then shaken with medium intensity for about 5 min. The product was then weighed back again on the analytical balance by thoroughly tapping out the individual sieves. A triple determination was carried out for each product.

The amounts of polysaccharide(s) (A) and synthetic polymer (B) are 6.67 parts by weight to 600 parts by weight of polysaccharide(s) (A) and 2.67 parts by weight to 100 parts by weight of synthetic polymer (B) per 100 parts by weight of elastomer component(s). Preference is given to 12.5 parts by weight to 553.33 parts by weight, very particularly preferably 33.33 parts by weight to 100 parts by weight, of polysaccharide(s) per 100 parts by weight of elastomer component in the seal compositions of the invention.

The preferred amounts of water-superabsorbent polymer range from 12.5 parts by weight to 37.5 parts by weight per 100 parts by weight of elastomer component.

The elastomer component(s) is (are) selected from vulcanized natural rubber (NR), vulcanized cis-1,4-polyisoprene rubber (IR), vulcanized polybutadiene (BR), vulcanized randomly copolymerized styrene-butadiene rubbers (SBR or SIR), vulcanized acrylate rubber, vulcanized acrylonitrile-diene rubbers (NBR or NIR), vulcanized polychloroprene (CR), vulcanized ethylene-propylene rubber (EPR), vulcanized isobutylene-isoprene rubbers (IIR), vulcanized ethylene-propylene-diene rubber (EPDM), vulcanized epichlorohydrin rubber, vulcanized silicone rubber, vulcanized polysulfide rubber, crosslinked polyurethanes, crosslinked thermoplastic elastomers.

Customary auxiliaries may be present in the seal compositions of the invention in the following amounts, based on 100 parts by weight of elastomer component(s):

| | |
|---|---|
| Fillers | 533.0 parts by weight |
| Lubricants | 114.3-0 parts by weight |
| Aging inhibitors | 15.4-0 parts by weight |
| Dyes | 15.4-0 parts by weight |
| Activators/accelerants | 15.4-0 parts by weight |
| Crosslinking agents | 15.4-0 parts by weight |
| Blowing agents | 66.7-0 parts by weight |
| Plasticizers | 114.3-0 parts by weight |

On using the water-swellable seal material of the invention in conventional sealing systems, the seal will conform to the introduced basic shape, especially the joint shapes, very rapidly because of the high swellability. This safely prevents the passage of water, usually at a relatively early stage of damage. If the seal material is used as joint profile, this profile will adapt to volume changes, for example of the structural body, by swelling on contact with water. Settlement tracks in the process of forming in the region of the joint profile will self-heal as a result of the rapid, sizable and controlled swelling.

The seal materials of the invention possess considerably improved processibility compared with known seal materials comprising bentonite and rubber, since there are no abrasion problems. Furthermore, the seal material of the invention is very resistant to elution by water in that the fraction of constituents eluted out is not more than 2%, based on the original tape mass. Furthermore, the seal material of the invention is produced from nontoxic main constituents compared with seal materials comprising acrylates/methacrylates or isocyanates. The lower density of the foamed seal materials of the invention appreciably reduces raw material requirements and provides for an appreciable reduction in costs for the sealing material.

Compared with water-swellable acrylate sealing materials, which harden on drying as a consequence of the loss of plasticizer effect, the seal material of the invention does not harden significantly on drying.

It is particularly advantageous to foam the composition of the invention to reduce the specific density. This is done by the measures known per se for the foaming of elastomers. Useful blowing agents include water, ammonium bicarbonate, sodium bicarbonate or organic blowing agents, for example sulfohydrazides (1,3-benzenedisulfonyl dihydrazide) or azodicarboxamides (azobisformamide), 5-morpholyl-1,2,3,4-thiatriazole.

Not only open-pored foams but also foams having closed pores may be produced.

Foaming further improves the water swellability.

In the foamed state, the composition of the invention has a specific density in the range from 0.01 g/cm$^3$ to 1.5 g/cm$^3$. If fillers are used, especially at high levels, the specific density will generally be higher than for a lower filler content.

The volume swell from the action of water on preformed seals as test specimens is determined as follows:

A test specimen, for example 5 cm in length, is placed in 500 ml of water pH 7 and 10° German hardness in a 600 ml glass beaker in such a way that it is completely covered with water and is allowed to swell at 23° C. The test specimen is then removed from the swell water at certain time intervals, adherent water is removed with a filter paper and within 1 minute the volume increase on dipping the swell tape into a graduated cylinder partly filled with water (e.g. a test specimen having a volume of 10 ccm (5 cm×1 cm×2 cm) is dipped into a 100 ml graduated cylinder containing 50 ml of water) is measured. The test specimen is then placed again in the 10° German hardness water for further swelling.

The volume swell is then the relative percentage volume increase according to $$\frac{\text{volume after swelling} - \text{volume before swelling}}{\text{volume before swelling}} \times 100 \text{ in } \%$$

The volume before swelling can be calculated in the case of a clear geometry, or else likewise be determined through the volume increase on immersion in water, the immersing and the reading off being completed within 20 seconds.

A preformed seal from the seal compositions of the invention increases 5–600% by volume on exposure to water for 3 to 7 days.

A relatively low-swellable seal for the purposes of the invention increases 5–30% by volume, preferably 10–20% by volume, on exposure to water for 3–7 days.

A relatively strongly swellable seal it increases more than 50% by volume to 500% by volume on exposure to water for 3–7 days.

In order to retard the start of swelling of preformed seals under the action of water an overcoating film which is relatively stable and/or impervious with regard to water having a substantially neutral pH at least part of the surface of the preformed may be applied to seal.

For the purposes of the present invention, the substantially neutral pH at which the overcoating film is water-resistant/water-impervious is the range of pH 5 to 9, and not just a pH of 7. On contact with water in the alkaline range, i.e. at a pH above 9, the overcoating film is water-pervious.

The relative resistance to water, or water imperviousness, can be set via the thickness of the overcoating layer. The layer is generally from 5 µm to 500 µm, preferably from 20 µm to 300 µm, in thickness.

The overcoating film comprises a matrix of a substantially water-insoluble filming polymer embedding the particulate alkali-soluble material. It is particularly preferable to construct the matrix of the same elastomer components as the seal compositions of the invention. Useful alkali-soluble material includes weakly acidic polymers, such as copolymers of lower olefins or styrene with maleic anhydride, poly(acrylic acid) or poly(methacrylic acid), polyacrylate or polymethacrylate or alkali-soluble inorganics, such as aluminum phosphates, basic zinc carbonates, metal powders of amphoteric metals, such as aluminum.

The overcoating film may be applied in various ways. For example by coating the surface of the preformed seal with a solution or dispersion of the constituents.

In an embodiment of the invention, the preformed seals are constructed as composite seals combining at least two or more parts having different water swellabilities.

Depending on the shape of the preformed seal as tape, round cord, endless profile, the parts can be constructed as a plurality of parallel layers or as a layer enveloping a part to a greater or lesser extent. In the case of profiles, one or more parts embedded in the profile surface may differ in swellability from the main part of the profile.

Generally, in this embodiment of composite seals, parts of relatively low swellability are combined with parts of relatively strong swellability.

To retard swelling on exposure to water, it is also possible, for example, to construct a core of the composite seal from a relatively strongly swellable seal composition and to envelop this core at least partially or completely with a layer of a relatively low-swellable seal composition.

When a less strongly swelling layer is applied to the outer surface of a preformed seal, then the rate of swell will initially be small and increase only gradually. This would be desirable in commercial practice in order that the preformed seal may not swell up strongly, i.e. lose some of its swellability, at installation, for example through contact with rain, and the then already preswollen seal material is left with a substantially reduced swellability on contact with water or dries out at the installed location and consequently shrinks and then initially the sealing effect is lost.

However, it is also possible to form a composite seal profile with a core strand which has a lower swellability than an outer strand which surrounds it at least partly and is formed from a seal composition of high swellability.

The swellability of the seal compositions can be adjusted by varying the above parameters responsible for the swelling: fraction of selected polysaccharide(s), fraction of synthetic polymers, degree of foaming or density and porosity of the material, degree of crosslinking and hardness.

Examples of the variation of swellability are reported in the table which follows:

| Material | Rubber Mixture Of Ex. 1 | Super-absorbent Cabloc C 96 | Starch | Density g/ccm of preformed seal | Degree of swelling (volume) % |
|---|---|---|---|---|---|
| Less Strongly Swelling | 50 | 10 | 35 | >1, not foamed | <10 (5)* |

-continued

| Material | Rubber Mixture Of Ex. 1 | Super-absorbent Cabloc C 96 | Starch | Density g/ccm of preformed seal | Degree of swelling (volume) % |
|---|---|---|---|---|---|
| Less Strongly Swelling | 35 | 2.5 | 62.5 | 0.66 | <25 (20)* |
| Less Strongly Swelling | 50 | 5 | 45 | 0.54 | <30 (25)* |
| Relatively Strongly Swelling | 50 | 15 | 35 | 0.52 | >100 (120)* |
| Relatively Strongly Swelling | 35 | 15 | 50 | 0.57 | >300 (400)* |

Degree of swelling: values reached after 3–7 days; volume swell in water pH 7 and 10° German hardness at 23° C., test specimen 5 cm × 2 cm × 2 cm
*degree of swelling after 5 days.

A particularly preferred seal composition comprises a mixture of natural rubber, starch and superabsorbent; it is foamed by heating by means of the water present in the material or by means of an added blowing agent and then vulcanized. The foamed elastomer, in material like a rubber sponge, has advantages in use because of the lower density, since relatively large quantities are now easier to handle and install in building construction. What is particularly advantageous, however, is that the swelling of the foamed material is many times higher and faster than that of the unfoamed material having the same composition.

The seal composition of the invention is producible in every conceivable form, particularly in the form of tapes, films, envelopes or profiles in any desired geometry. Depending on the intended use, for example, tapes can be produced for joint sealing and films for the outer sealing of buildings.

For preformed seals, the forming may be effected using a roll calender or an extruder equipped with a slot die or a round-section die or a profile die with subsequent calibration or injection molding or compression molding.

The seal composition includes a blowing agent and is expanded on forming by heating to 100° C. or higher with vulcanizing or crosslinking of the rubber and/or elastomer component so that the specific density is in the range from 0.01 g/cm$^3$ to 1.5 g/cm$^3$.

In the case of preformed composite seals combining at least two or more parts having different water swellabilities, the seal compositions having different water swellabilities are formed conjointly or in succession, conjointly by coextrusion for example. However, it is also possible to use other forming processes suitable for coforming.

In an embodiment of preformed composite seals, the water swellability of the seal composition differs as a result of using seal compositions having a volume increase of 5–30% by volume and seal compositions having a volume increase of 50–500% by volume on exposure to water for 3–7 days.

EXAMPLES

Inventive Example 1 a) Mixture Preparation

A laboratory scale set of mixing rolls from Schwabenthan of Berlin was used to produce the rubber mixture for the seal material. The ratio of the speeds of the back roll to the front roll (friction) was about 1.2. The front roll turned at about 12 rpm; roll temperature: 60° C., masticating time: 5–30 min.

100 parts of natural rubber (SMR, Uniroyal Aachen) was put on the roll at a roll width of about 3 mm. The nip was narrowed until a coherent sheet traveled around the front roll. To speed up mastication, the rubber was repeatedly incised with a blade. The mastication degraded the rubber and so brought about the necessary consistency.

After mastication, 1.5 parts of zinc oxide (active), 2.5 parts of sulfur (90% crystalline), 0.1 part of dibenzothiozyl disulfide (Vulkazit DM, Bayer AG, Leverkusen), 1.2 parts of zinc diethyldithiocarbamate (Vulkazit LDA, Bayer AG, Leverkusen), 0.4 part of tetramethylthiuram disulfide (Vulkazit Thiuram, Bayer AG, Leverkusen), 1 part of stearic acid and 5 parts of Porofor TSH (foam-former, Bayer AG, Leverkusen) were mixed in. 50 parts of this rubber mixture are then admixed with 35 parts of potato starch (fr. Müllers Mühle) and 15 parts of superabsorbent (Cabloc C96, fr. Stockhausen, Krefeld), which had previously been mixed, added in portions by not adding a portion until the previous portion of starch-superabsorbent had been taken up by the rubber. The sheet is taken off with the nip at 3 mm.

b) Foaming, Forming, Crosslinking

About 120 g of the sheets thus obtained are cut into strips about 1–1.5 cm in width. These strips are pressed on top of each other and placed in a slat about 50 cm in length and 2 cm×2 cm in internal cross section. The mold is closed and placed in an oven at 100° C. for 30 min. The oven is then heated to 160° C. (duration about 20 min). On reaching the temperature the mold is removed from the oven, briefly cooled and the tape is demolded. The sealing tapes thus obtained have a density of 0.5 to 0.7 g/cm$^3$.

Inventive Example 2

The sheets obtained according to Example 1a) are introduced into an extruder (from Brabender, Duisburg), with all the heating zones and the die being set to 80° C. The die was 3 mm and the barrel 2.1 cm in diameter. The screw was operated at 50 rpm. The sausage-shaped extrudate was introduced in an oven and foamed at 100° C. for 30 min and then vulcanized at 160° C.

Inventive Example 3

Inventive Example 1 was repeated by partly replacing or increasing the starch content to produce seal compositions having different fractions of superabsorbent (5 to 20 parts).

Testing the swelling characteristics revealed that a seal material comprising 15 and 20% superabsorbent has a swellability of 50% by volume after 3 days, whereas a seal composition comprising 10 parts of superabsorbent swelled only 20% by volume and a seal composition comprising 5 parts of superabsorbent only 10% by volume.

It is thus to be noted that the amount of superabsorbent has a remarkably large influence on the swellability of the seal composition.

Comparative Example 1

Inventive Example 1 was repeated to produce a zero-starch seal composition comprising 15 parts of superabsorbent.

Testing the swelling characteristics revealed that the seal material without starch has a swellability of about 1% by volume after 3 days, whereas the seal material of Inventive Example 1, comprising 15 parts of superabsorbent and 35 parts of potato starch, had a swellability of 50% by volume after 3 days.

It thus is to be noted that the combination of polysaccharide with water-superabsorbent synthetic polymer is essential for the swellability of the seals.

Inventive Example 4

Inventive Example 1 was repeated to produce milled sheets at 40° C. on mixing rolls from 100 parts of natural rubber, 5 parts of zinc oxide (active), 1 part of antioxidant WSL, 1 part of stearic acid, 3 parts of sulfur (90% crystalline), 1.5 parts of Vulkazit D (Bayer AG, Leverkusen). 50 parts of this rubber mixture were then admixed on the mixing rolls with 40 parts of potato starch, 5 parts of Favor SAB superabsorbent and 5 parts of sodium bicarbonate.

These sheets give a mass swell of only 20% in the unfoamed and nonvulcanized state even after 11 days. The density was about 1.04 g/cm$^3$. The foamed samples, having densities of about 0.5 to 0.6 g/cm$^3$, by contrast, give a mass swell of 500% after just 7 days.

It is thus to be noted that the foaming or density of the sealing material has a decisive influence on the swellability of the compositions.

Inventive Example 5

On vulcaninizing the foamed material of Inventive Example 4 at 160° C. the mass swell after 7 days was 300%.

It is thus to be noted that the vulcanization or crosslinking of the rubber elastomer component has an important influence on the swellability of the material.

Inventive Example 6

Inventive Example 4 was repeated to produce a seal composition using a more finely divided superabsorbent: Favor CA100 Feinstkorn, fr. Stockhausen, Krefeld.

Testing the swelling characteristics reveals that use of the more finely divided superabsorbent greatly minimizes the bursting or swelling out of the superabsorbent to the naked eye in that, after swelling, there is no longer any superabsorbent to be seen on the tape surface. Eluted constituents amounted to 3.5% by mass on using the coarsely particulate superabsorbent and 2.9% by mass on using the more finely particulate superabsorbent.

It is thus to be noted that the particle size of the superaborbent has an important influence on whether it, on swelling, is retained in the material or flushed out to a certain extent.

Inventive Example 7

Inventive Example 2 was repeated to produce seal compositions which contained no superabsorbent, but instead swellable alginate. 50 parts of the rubber mixture according to Example 1 were admixed with 10 parts of alginate and 40 parts of potato starch, 15 parts of alginate and 35 parts of potato starch, and also 20 parts of alginate and 30 parts of potato starch.

Testing the swelling characteristics revealed that 20 parts of alginate provide a volume swell of 60%. However, in the process, 10 mass percent of the sealing material are flushed out and, on reswelling, only 50 volume percent are achieved.

It is thus to be noted that, evidently, good attachment in the elastomer matrix requires a certain particle size, which in turn must not be too large according to Inventive Example 6, and also insolubility in water, since the water-soluble alginate can be flushed out.

What is claimed is:

1. A water-swellable seal composition for preformed seals comprising: a matrix of an elastomer component and embedded particulate water-absorbent material which water-absorbent material is the combination of;
   (a) a polysaccharide selected from the group consisting of microcrystalline cellulose, amorphous cellulose, starch, starch derivatives except grafted starch, amylose, amylopectin, dextrans, pectins, insulin, chitin, xanthan, alginic acid, alginates, carragheenan, pustulan, callose, laminarin, guluronic acid, pullulan, lichenin and mixtures thereof; with
   (b) a water-superabsorbent synthetic polymer selected from the group consisting of polymers based on (meth) acrylate, poly(meth)-acrylic acid and salts thereof, polyacrylamide, polyalcohols, copolymers thereof, and mixtures thereof;
   wherein the seal composition is foamed by means of a blowing agent and heated to 100° C. or higher and whereupon the elastomer component is crosslinked.

2. A water-swellable composition according to claim 1, wherein said composition includes 6.67 parts by weight to 600 parts by weight of said polysaccharide and 2.67 parts by weight to 100 parts by weight of said water-superabsorbent synthetic polymer per 100 parts by weight of said elastomer component.

3. The seal composition according to claim 1, wherein the elastomer component is selected from the group consisting of vulcanized natural rubber (NR), vulcanized cis-1,4-polyisoprene rubber (IR), vulcanized polybutadiene (BR), vulcanized randomly copolymerized styrene-butadiene rubbers (SBR or SIR), vulcanized acrylate rubber, vulcanized acrylonitrile-diene rubbers (NBR or NIR), vulcanized polychloroprene (CR), vulcanized ethylene-propylene rubber (EPR), vulcanized isobutylene-isoprene rubbers (IIR), vulcanized ethylene-propylene-diene rubber (EPDM), vulcanized epichlorhydrin rubber, vulcanized silicone rubber, vulcanized polysulfide rubber, crosslinked polyurethanes, crosslinked thermoplastic elastomers and combinations thereof.

4. The seal composition according to claim 1, wherein the water-superabsorbent synthetic polymer has an average particle size in the range from 5 μm to 800 μm.

5. The seal composition according to claim 1, wherein the seal composition includes one or more additives selected from the group consisting of lubricants, aging inhibitors, dyes, fillers, blowing agents, plasticizers, crosslinking agents, crosslinking accelerants, activators, retarders and combinations thereof.

6. The seal composition according to claim 5, wherein the seal composition has a specific density in the range from 0.01 g/cm$^3$ to 1.5 g/cm$^3$.

7. The seal composition according to claim 1, wherein the volume of the seal composition increases by 5% to 600% by volume upon exposure to water.

8. The seal composition according to claim 7, wherein the volume of the seal composition increases by 5% to 30% by volume upon exposure to water for 3 to 7 days.

9. The seal composition according to claim 7, wherein the volume of the seal composition increases by more than 50% by volume to 500% by volume upon exposure to water for 3 to 7 days.

10. The seal composition according to claim 7, wherein the seal composition is formed into a form to provide a preformed seal, said preformed seal having one or more cross-sections.

11. The seal composition according to claim 10, wherein the preformed seal is in a form selected from the group consisting of a tape, a film, an envelope, a round cord, an endless profile and combinations thereof.

12. The seal composition according to claim 1, wherein the seal composition is formed into a preformed seal, wherein said preformed seal is constructed as a composite seal wherein at least two or more parts of said performed seal have differing water swellabilities.

13. The seal composition according to claim 10, wherein the preformed seal is constructed as a composite seal wherein at least two or more parts of said performed seal have differing water swellabilities.

14. The seal composition according to claim 12, wherein the composite seal comprises one or more parts with a volume increase of 5% to 30% by volume upon exposure to water and one or more parts with a volume increase of more than 50% to 500% by volume upon exposure to water.

15. The seal composition according to claim 13, wherein the composite seal comprises one or more parts with a volume increase of 5% to 30% by volume upon exposure to water and one or more parts with a volume increase of more than 50% to 500% by volume on exposure to water.

16. The seal composition according to claim 10, wherein the swelling of said preformed seal under the action of water is appreciably retarded on at least part of a surface of the preformed seal by associating with said part of said surface an overcoating film which is relatively stable and/or impervious with regard to water having a substantially neutral pH, but unstable and water-pervious with regard to water at an alkaline pH.

17. The seal composition according to claim 12, wherein the swelling of said composite seal under the action of water is appreciably retarded on at least part of a surface of the composite seal by associating with said part of said surface an overcoating film which is relatively stable and/or impervious with regard to water having a substantially neutral pH, but unstable and water-pervious with regard to water at an alkaline pH.

18. The seal composition according to claim 14, wherein the swelling of said composite seal under the action of water is appreciably retarded on at least part of a surface of the composite seal by associating with said part of said surface an overcoating film which is relatively stable and/or impervious with regard to water having a substantially neutral pH, but unstable and water-pervious with regard to water at an alkaline pH.

19. The seal composition according to claim 15, wherein the swelling of said composite seal under the action of water is appreciably retarded on at least part of a surface of the composite seal by associating with said part of said surface an overcoating film which is relatively stable and/or impervious with regard to water having a substantially neutral pH, but unstable and water-pervious with regard to water at an alkaline pH.

20. A process for producing a preformed seal which swells under the action of water, from a seal composition, which seal composition includes a matrix of an elastomer component and an embedded particulate water-absorbent material, wherein the water-absorbent material is a combination of a polysaccharide selected from the group consisting of microcrystalline cellulose, amorphous cellulose, starch, starch derivatives except grafted starch, amylose, amylopectin, dextrans, pectins, insulin, chitin, xanthan, alginic acid, alginates, carragheenan, pustulan, callose, laminarin, guluronic acid, pullulan, lichenin, and mixtures thereof, with a water-superabsorbent synthetic polymer selected the group consisting of polymers based on (meth)acrylate, poly(meth)-acrylic acid and salts thereof, polyacrylamide, polyalcohols, copolymers thereof, and mixtures thereof, said process comprising the steps of:

a) mixing the elastomer component, the water-absorbent material and an optional blowing agent to form the seal composition;

b) forming the seal composition into preformed seals having one or more cross-sections, wherein during the forming step the seal composition is foamed by the blowing agent; and c) heating the preformed seal to 100° C. or higher to crosslink the elastomer component whereupon the volume increase of said preformed seal upon exposure to water is 5% to 600% by volume.

21. The process according to claim 20, wherein the mixing step is effected using a mixing device selected from the group consisting of a mixing roll, an internal mixer and an extruder and forming step is effected using a forming device selected from the group consisting of a roll calendar and an extruder, said forming device being equipped with a die selected from the group consisting of a slot die, a round-section die, and a profile die, the process further comprising the step of subjecting said seal composition to a subsequent processing operation selected from the group consisting of calibration, injection molding and compression molding.

22. The process according to claim 20, wherein the foamed seal composition has a specific density in the range from 0.01 g/cm$^3$ to 1.5 g/cm$^3$.

23. The process according to claim 21, wherein the foamed seal composition has a specific density in the range from 0.01 g/cm$^3$ to 1.5 g/cm$^3$.

24. The process according to claim 20, wherein a composite seal having at least two or more parts having different water swellabilities is formed by coforming a first seal composition exhibiting a volume increase of 5% to 30% by volume on exposure to water with a second seal composition exhibiting a volume increase of 50% to 500% by volume on exposure to water.

25. The process for producing preformed seals which swell under the action of water according to claim 20 further comprising the step of associating an overcoating film with at least a part of a surface of the preformed seal, wherein said overcoating film is relatively stable and/or impervious with regard to water having a substantially neutral pH, but unstable and water-pervious with regard to water at an alkaline pH whereupon the swelling of at least a part of said preformed seal upon exposure to water may be substantially retarded.

26. The process for producing preformed seals which swell under the action of water according to claim 24, further comprising the step of associating an overcoating film with at least a part of a surface of the composite seal, wherein said overcoating film is relatively stable and/or impervious with regard to water having a substantially neutral pH, but unstable and water-pervious with regard to water at an alkaline pH whereupon the swelling of at least a part of said preformed seal upon exposure to water may be substantially retarded.

27. A water-swellable seal comprising:

(a) an elastomer component; and (b) a particulate water-absorbent material embedded within said elastomer component, wherein said water absorbent material includes a polysaccharide selected from the group consisting of microcrystalline cellulose, amorphous cellulose, starch, starch derivatives except grafted starch, amylose, amylopectin, dextrans, pectins, insulin, chitin, xanthan, alginic acid, alginates, carragheenan, pustulan, callose, laminarin, guluronic acid, pullulan, lichenin and mixtures thereof, with a water-superabsorbent synthetic polymer selected from the group consisting of polymers based on (meth) acrylate, poly(meth)acrylic acid and salts thereof, polyacrylamide, polyalcohols, copolymers thereof, and mixtures thereof.

28. The water-swellable seal of claim 27, wherein said seal is a composite seal having at least two or more parts having differing water swellabilities.

* * * * *

UNITED STATES PATENT AND TRADEMARK OFFICE
CERTIFICATE OF CORRECTION

PATENT NO.      : 6,358,580 B1
DATED           : March 19, 2002
INVENTOR(S)     : Thomas Mang et al.

It is certified that error appears in the above-identified patent and that said Letters Patent is hereby corrected as shown below:

Title page,
Item [57], ABSTRACT,
Line 10, delete "inulin" and insert -- insulin --.

Column 1,
Line 47, delete "previous" and insert -- pervious --.

Column 5,
Line 26, delete "9" and insert -- g --.

Column 8,
Line 2, insert a space between "$\mu$m" and "to".

Signed and Sealed this

Fourth Day of March, 2003

JAMES E. ROGAN
*Director of the United States Patent and Trademark Office*